United States Patent Office 2,900,357
Patented Aug. 18, 1959

2,900,357

OIL EXTENDED GR–S RUBBER HAVING UNUSUAL LOW TEMPERATURE RETRACTION CHARACTERISTICS

George W. Ayers and Norman D. Williams, Chicago, Ill., assignors to The Pure Oil Company, Chicago, Ill., a corporation of Ohio No Drawing. Application September 2, 1953
Serial No. 378,168

10 Claims. (Cl. 260—33.6)

This invention relates to rubber compositions. A more specific aspect of this invention relates to rubber compositions having improved characteristics obtained by employing novel processing oils in the preparation of the rubber compositions. In a still more specific aspect, the present invention relates to the utilization of refined mineral oils as processing oils in the preparation of synthetic rubbers.

Prior to the introduction of synthetic rubbers during World War II, vegetable and mineral oils and materials of like character had been used in small amounts in the processing of natural rubbers. In this particular application, a small amount of the oil was added to the rubber in its latex form as a softening agent to reduce power consumed in mixing and mastication of the rubber mass. Likewise, small amounts of vegetable and mineral oils had also been used in reclaiming rubbers and, thus, were incorporated in finished products which often contained a substantial amount of reclaimed rubber as a component.

The short supply of rubber and the introduction of synthetic rubbers during World War II brought a number of new problems to the rubber industry and necessitated much work before the synthetic rubbers could be used successfully. Many of these problems involved modifiers and extenders for the new rubbers and for formulations involving admixtures of the new rubbers with natural rubber.

The most important synthetic rubber developed was GR–S, which was formed by the polymerization of approximately 72 parts of butadiene with 28 parts of styrene with a peroxide or persulfate catalyst and a mercaptan as a modifying agent to control the degree of polymerization. The polymerization was carried out by (1) the hot process or (2) the cold process, the former process accounting for the largest part of synthetic rubber production. However, "cold" rubber was found to be of higher quality than regular GR–S (hot rubber). A further and more recent discovery was that polymers produced by more complete polymerization of the same mixture of butadiene and styrene were superior in quality to either the "hot" or "cold" rubbers formerly produced. These high-molecular weight products are polymerized to a degree such that their Mooney viscosities are substantially above 65 when measured at 212° F. for 4 minutes. An example of such products is "Polygen" GR–S produced by General Tire and Rubber Company.

Since synthetic rubber has a higher Mooney viscosity than natural rubber and the milling of rubber is dependent upon the Mooney viscosity of the rubber, means of decreasing the high Mooney viscosity were necessarily devised. Heat-softening is one method which has been used for reducing the Mooney viscosity of artificial rubber (particularly "hot" rubber). However, this method has not been too successful from a commercial standpoint. From the standpoint of processing ease, it was determined that the addition of oils, such as those previously employed as softeners or plasticizers, reduced the Mooney viscosity to the extent desired and had no detrimental effect on the physical properties of the product. It was also found that these processing oils could be used in amounts far in excess of the amounts normally used in softening and plasticizing to replace a certain amount of the synthetic polymer and thus "extend" the polymer.

The use of oils of petroleum origin as extenders or processing oils for natural rubber and synthetic elastomers was first proposed in 1936. The first product introduced for this purpose was Naftolen, a petroleum oil recovered from the acid sludge produced in the treatment of petroleum oils with sulfuric acid. This material was used commercially as a rubber extender just before and during World War II. Early work with Naftolen indicated that the carbon black content of the rubber should be increased with the increase in the proportion of Naftolen used in the rubber. In its capacity as an extender, Naftolen was shown to be suitable for use in natural rubber, GR–S, and reclaimed rubber. In view of the developments outlined above and the successful use of Naftolen, a number of petroleum oil extenders soon appeared on the market. Naphthenic oils, such as Circosol 2XH, as well as highly aromatic oils, such as extracts from the solvent extraction of lubricating oils, were used commercially. Although practically any aromatic or naphthenic mineral oil can be employed with fair results when relatively small amounts of oil (in the neighborhood of about 25 parts of oil per 100 parts of rubber polymer) are incorporated, synthetic elastomers are more sensitive to the type of oil when larger amounts of oil are employed. This is particularly true in the case of high Mooney viscosity GR–S rubbers, which tolerate amounts of oil as high as 100 parts of oil per 100 parts of rubber polymer. While rubbers prepared with large amounts of aromatic or naphthenic petroleum oils are satisfactory in most respects, these rubbers are notably inferior so far as their low temperature retraction properties are concerned. This failure of rubbers containing large amounts of commercially known processing oils to regain their original shape at a suitable rate at low temperatures is particularly vexing when the rubbers are used in the preparation of pneumatic tire tread stocks.

It is, therefore, an object of the present invention to provide an improved rubber composition.

It is another and further object of the present invention to provide a rubber composition having improved low temperature retraction characteristics.

A further object of this invention is to provide an improved pneumatic tire stock having improved low temperature retraction characteristics.

Still another object of this invention is to provide a rubber composition extended with large amounts of an improved processing oil.

Another and further object of this invention is to provide a high Mooney viscosity GR-S rubber having improved low temperature retraction characteristics.

A still further object of this invention is to provide an improved high Mooney viscosity GR-S rubber containing large amounts of a novel processing oil.

Another object of this invention is to provide an improved high Mooney viscosity GR-S rubber tire stock containing a novel processing oil.

Other and further objects of this invention will be apparent from the following detailed description of this invention.

Contrary to the teachings of the prior art, it has been found that highly paraffinic mineral oils may be used as rubber extenders in the processing of synthetic and natural rubbers. In a more specific aspect, it has been found that a solvent refined paraffinic petroleum oil boiling in the lubricating oil range is far superior to commercially available aromatic and naphthenic rubber processing oils, particularly in the low temperature retraction properties which it imparts to high Mooney viscosity GR-S rubbers.

In order to demonstrate the advantages of the processing oils of the present invention, a number of rubbers were prepared using the following formula:

| | Parts |
|---|---|
| High Mooney viscosity GR-S polymer | 100.0 |
| Petroleum oil | 50.0 |
| Philblack "O" | 75.0 |
| Zinc oxide | 3.0 |
| Stabilite | 0.8 |
| BLE | 0.8 |
| D.P.G. | 0.2 |
| Santocure | 1.1 |
| Sulfur | 2.1 |

The high Mooney viscosity GR-S polymer was produced by the co-polymerization of approximately 28 parts of styrene and 72 parts of butadiene at approximately 41° F. The ingredients shown above were milled using as the petroleum oil a solvent refined neutral oil having the following characteristics:

| | |
|---|---|
| Gravity (° API) | 31.5 |
| Flash (C.O.C.) (° F.) | 420 |
| Fire (C.O.C.) (° F.) | 470 |
| Vis./100° F. (SUS) | 166.1 |
| Vis./210° F. (SUS) | 44.6 |
| Viscosity index | 105 |
| Pour (max.) | 5 |
| Color (NPA) | +1 |
| Aniline point (° F.) | 219.9 |
| Acid No. (ASTM method D974–51T) | 0.03 |
| Ash (oxide) (percent) | 0.01 |
| Carbon residue (Conradson) (percent) | 0.00 |
| Sulfur (percent) | 0.21 |
| Bromine No. | 1.4 |
| Refractive index ($n_D^{20°\ C.}$) | 1.4780 |
| Evaporation test (280° F): | |
|    Loss in 6 hrs. (percent) | 3.37 |
|    Loss in 12 hrs. (percent) | 5.70 |
| Rostler analysis: | |
|    Nitrogen Bases (percent) | 0.4 |
|    1st Acidifins (percent) | 0.0 |
|    2nd Acidifins (percent) | 20.4 |
|    Saturates (percent) | 79.2 |

For purposes of comparison, compositions of the above-mentioned formula were also milled using as the petroleum oil Circosol 2XH, a commercially available naphthenic type processing oil. A comparison of the properties of the rubber obtained from these two batches is given in Table I below, wherein the paraffinic oil described is referred to as Paraffinic Oil 1:

Table I

| Extender used | Paraffinic Oil 1 | Circosol 2XH |
|---|---|---|
| 300% Modulus (45 min. cure at 287° F.) | 1,775 | 1,400 |
| Tensile (45 min. cure at 287° F.) | 2,675 | 2,600 |
| Elongation (45 min. cure at 287° F.) | 400 | 450 |
| Tear (45 min. cure at 287° F.) | 178 | 199 |
| Hardness (45 min. cure at 287° F.) | 56 | 55 |
| Rebound (60 min. cure at 287° F.) | 61.5 | 53.9 |
| Mooney Plasticity: | | |
|   ML 1.5 min. at 212° F. | 56 | 43 |
|   ML 4.0 min. at 212° F. | 50 | 39 |
| Tests on rubber aged 48 hours in oven at 212° F.: | | |
|   Tensile (45 min. cure at 287° F.) | 2,150 | 2,000 |
|   Elongation (45 min. cure at 287° F.) | 230 | 270 |
|   Hardness (45 min. cure at 287° F.) | 66 | 65 |
| Tensile Retraction on Cured Rubber: | | |
|   1% Recovery °C | −65 | −48 |
|   2% °C | −61 | −46 |
|   3% °C | −60 | −45 |
|   5% °C | −56 | −43 |
|   10% °C | −53 | −41 |
|   20% °C | −50 | −37 |
|   30% °C | −48 | −36 |
|   40% °C | −46 | −35 |
|   50% °C | −43 | −31 |
|   60% °C | −40 | −28 |
|   70% °C | −36 | −24 |
|   80% °C | −32 | −19 |
|   90% °C | −25 | −12 |

It will be seen from the results shown above that the rubber containing the preferred processing oil of this invention is similar to that containing the Circosol 2XH with the exception of tensile retraction. With regard to this particular property, it is obvious that the rubber extended with the processing oil of this invention is vastly superior to that extended with the commercially available processing oil. Further, tests have shown that aromatic extenders are the same as or are inferior to Circosol 2XH with respect to their ability to impart good low temperature retraction properties to GR-S. The rubbers prepared with the preferred extender of this invention are particularly useful in the preparation of pneumatic tire tread stocks. Flat spots in the tire tread formed as a result of low temperature parking of vehicles will disappear more rapidly if the tire is composed of rubber extended with processing oils of this invention.

Road tests of tires prepared from GR-S rubbers extended with the processing oils of this invention have been made. These tests show that the improved rubbers of the present invention are superior in wear characteristics to those prepared in accordance with prior art methods.

The processing oils of the present invention may be added to the rubbers by (1) emulsification with water and coprecipitation of the mixture of oil and rubber emulsions (masterbatching), (2) direct milling into precipitated GR-S rubber, and (3) a combination of both methods. However, it has also been found, in accordance with the present invention, that the processing oils of this invention may be masterbatched with the rubber polymers with the same ease as the naphthenic and aromatic extenders of the prior art.

In contrast to the low viscosity paraffinic oils of the present invention, it has also been found that paraffinic oils having viscosities at 210° F. of greater than 150 SUS are unsatisfactory for use in the preparation of synthetic rubbers. Attempts to incorporate a solvent refined oil having a viscosity of 151.7 SUS at 210° F. were unsuccessful due to the fact that the oil was incompatible with the rubber polymers. Therefore, the preferred oils of the present invention are oils having a viscosity of approximately 30 to 150 SUS at 210° F. Table II below outlines the characteristics of several processing oils which have been found suitable for use in accordance with the present invention:

Table II

|  | Paraffinic Oil 1 | Paraffinic Oil 2 |
|---|---|---|
| Gravity (° API) | 31.5 | 30.0 |
| Flash (C.O.C.) (° F.) | 420 | 465 |
| Fire (C.O.C.) (° F.) | 470 | 525 |
| Vis./100° F. (SUS) | 166.1 | 410 |
| Vis./210° F. (SUS) | 44.6 | 59.4 |
| Viscosity Index | 105 |  |
| Pour (Max.) | 5 | 0 |
| Color (NPA) | +1 | 2+ |
| Aniline Point (° F.) | 219.9 | 237.2 |
| Acid No. (ASTM Method D974-51T) | 0.03 | 0.07 |
| Ash (Oxide) (Percent) | 0.01 | Nil |
| Carbon Residue (Conradson) (Percent) | 0.00 | 0.07 |
| Sulfur (Percent) | 0.21 | 0.25 |
| Bromine No. | 1.4 | 15.6 |
| Refractive Index ($n_D 20°$ C.) | 1.4780 | 1.4820 |
| Evaporation Test (280° F.): |  |  |
| Loss in 6 hrs. (Percent) | 3.37 | 1.40 |
| Loss in 12 hrs. (Percent) | 5.70 | 2.17 |
| Rostler Analysis: |  |  |
| Nitrogen Bases (Percent) | 0.4 |  |
| 1st Acidifins (Percent) | 0.0 |  |
| 2nd Acidifins (Percent) | 20.4 |  |
| Saturates (Percent) | 79.2 |  |

In the preparation of rubber products containing the paraffinic oil extenders of the present invention, amounts of oil extender up to 100 parts of extender per 100 parts of rubber hydrocarbon may be employed. However, 25 to 50 parts of oil per 100 parts of rubber hydrocarbon are preferred.

In addition to the extender, the rubber composition normally contains other additives, of which one is necessarily the vulcanizing agent. Suitable agents of this character are sulfur, sulfur chloride, certain thiocyanates, thiuram polysulfides, and other organic and inorganic polysulfides, organic and inorganic peroxides, halogen-containing compounds and nitrogen-containing compounds such as the nitrobenzenes.

Vulcanization accelerators and accelerator-activators may also be present. Illustrative examples of accelerators are N-cyclohexyl-2-benzothiazole sulfenamide (Santocure), diphenylguanidine, mercaptobenzothiazole and its derivatives, thiuram disulfides, thiuram monosulfides and dithiocarbamates. The metal oxides, such as zinc oxide and lead oxide are ordinarily added as accelerator-activators. It is also common practice to add a fatty acid such as stearic acid or oleic acid as an accelerator-activator in addition to the metal oxide.

Age deterioration of rubber goods is generally reduced by the addition of antioxidants such as phenyl-beta-naphthylamine, amine reaction products known in the trade as "BLE," and "Agerite" products such as hydroquinone mono benzyl ether, aldol-alpha-naphthylamine, di-beta-naphthyl-para-phenylenediamine, and diphenyl-ethylene diamine ("Stabilite").

Carbon blacks such as "Philblack O," high abrasion furnace (HAF) blacks, etc., are also major components. These materials act as bodying agents or fillers, thereby improving the tensile strength, tear resistance, and other like properties of the rubber product.

The processing oils of the present invention may also be used in the preparation of a variety of rubbers and rubber products in addition to high Mooney viscosity GR-S rubbers. It is generally conceded that processing oils suitable for use in high Mooney viscosity GR-S rubbers are suitable for use in ordinary GR-S rubbers due to the more stringent requirements of the high Mooney viscosity rubber. It has also been found that the processing oils of the present invention may be used in the preparation of rubbers from co-polymers of olefins and di-olefins, such as Butyl rubbers normally used in the preparation of vehicle inner tubes. Likewise, processing oils of this invention may be used in the preparation of a wide variety of specialized rubbers, such as the light-colored rubbers used in preparing white side-wall tires and like rubber articles. Processing oils of the present invention may also be used for other purposes, such as softeners for the reclaiming of natural and synthetic rubbers, etc.

What is claimed is:

1. An improved vulcanizable rubber composition comprising, a synthetic hydrocarbon polymer rubber having permanently incorporated therein a rubber extending amount of a mineral oil consisting of the raffinate phase obtained in the solvent extraction of a petroleum fraction boiling in the lubricating oil boiling range and obtained from a paraffinic base crude, said mineral oil consisting essentially of a predominant proportion of saturates and a minor proportion of second acidifins by Rostler analysis, having an average viscosity of 30–150 SUS at 210° F., and being present in said composition in an amount sufficient to improve substantially the low temperature retraction characteristics of the rubber produced upon vulcanization of the composition.

2. A composition according to claim 1 in which said synthetic rubber is a rubbery butadiene-styrene co-polymer.

3. An improved vulcanizable rubber composition comprising, a rubbery butadiene-styrene co-polymer having a Mooney viscosity substantially above 65 at 212° F. for four minutes, having permanently incorporated therein a rubber extending amount of a mineral oil consisting of the phenol-free raffinate phase obtained in the phenol extraction of a petroleum fraction boiling in the lubricating oil boiling range and obtained from a paraffinic base crude, said mineral oil consisting essentially of a predominant proportion of saturates and a minor proportion of second acidifins by Rostler analysis, having an average viscosity of 30–150 SUS at 210° F. and being present in said composition in an amount sufficient to improve substantially the low temperature retraction characteristics of the rubber produced upon vulcanization of the composition.

4. The composition according to claim 3 in which said mineral oil is present in the amount of 25–100 parts by volume per 100 parts of said polymer.

5. A pneumatic tire stock having improved low temperature retraction characteristics comprising, a rubbery butadiene-styrene co-polymer having a Mooney viscosity substantially above 65 at 212° F. for four minutes, having permanently incorporated therein 25 to 50 parts per volume per 100 parts of said polymer of a mineral oil consisting of the phenol-free raffinate phase obtained in the phenol extraction of a petroleum fraction boiling in the lubricating oil boiling range and obtained from a paraffinic base crude, said mineral oil consisting essentially of a predominant proportion of saturates and a minor proportion of second acidifins by Rostler analysis and having a viscosity of about 30–150 SUS at 210° F.

6. The pneumatic tire stock according to claim 5 in which said mineral oil is composed of about 79% saturates and 20% second acidifins.

7. A pneumatic tire stock having improved low temperature retraction characteristics comprising, a rubbery butadiene-styrene co-polymer having a Mooney viscosity substantially above 65 at 212° F. for four minutes, having permanently incorporated therein 25 to 50 parts per volume per 100 parts of said polymer of a mineral oil consisting of the phenol-free raffinate phase obtained in the phenol extraction of a petroleum fraction boiling in the lubricating oil boiling range and obtained from a paraffinic base crude, said mineral oil consisting essentially of a predominant proportion of saturates and a minor proportion of second acidifins by Rostler analysis and having a viscosity of about 30–150 SUS at 210° F., a vulcanizating agent, a vulcanization accelerator, an accelerator-activator, an anti-oxidant, and a bodying agent.

8. A pneumatic tire stock having improved low temperature retraction characteristics comprising, a rubbery butadiene-styrene co-polymer having a Mooney viscosity substantially above 65 at 212° F. for four minutes, having permanently incorporated therein 25 to 50 parts per volume per 100 parts of said polymer of a mineral oil consisting of the phenol-free raffinate phase obtained in the phenol extraction of a petroleum fraction boiling in the lubricating oil boiling range and obtained from a paraffinic base crude, said mineral oil consisting essentially of a predominant proportion of saturates and a minor proportion of second acidifins by Rostler analysis and having a viscosity of about 30–150 SUS at 210° F., a carbon black, sulfur, diphenylguanidine, N-cyclohexyl-2-benzothiazole sulfenamide, an anti-oxidant organic amine, and a metal oxide.

9. A pneumatic tire stock having improved low temperature retraction characteristics comprising, a rubbery butadiene-styrene co-polymer having a Mooney viscosity substantially above 65 at 212° F. for four minutes, having permanently incorporated therein 25 to 50 parts per volume per 100 parts of said polymer of a mineral oil consisting of the phenol-free raffinate phase obtained in the phenol extraction of a petroleum fraction boiling in the lubricating oil boiling range and obtained from a paraffinic base crude, said mineral oil consisting essentially of a predominant proportion of saturates and a minor proportion of second acidifins by Rostler analysis and having a viscosity of about 30–150 SUS at 210° F., 75 parts by volume of carbon black, 3 parts by volume of zinc oxide, 0.8 part by volume of an anti-oxidant organic amine, 0.8 part by volume of diphenyl ethylene diamine, 0.2 part by volume of diphenylguanidine, 1.1 parts by volume of N-cyclo-hexyl-2-benzothiazole sulfenamide, and 2.1 parts by volume of sulfur.

10. A pneumatic tire stock according to claim 9 in which the mineral oil is composed of about 79% saturates and 20% second acidifins.

References Cited in the file of this patent

Rostler: Rubber Age, volume 69, No. 5, August 1951, pages 559–577.

Rostler et al.: Ind. and Eng. Chem., volume 41, No. 3, March 1949, pages 598–608.

Harrington et al.: India Rubber World, volume 124, No. 5, August 1951, pages 571–575.

Weinstock et al.: Rubber Age, December 1951, pages 333–338.

Weinstock et al.: Ind. and Eng. Chem., volume 45, No. 5, May 1953, pages 1035–1943.